(12) United States Patent
Fine et al.

(10) Patent No.: US 9,512,311 B2
(45) Date of Patent: Dec. 6, 2016

(54) POLY(LACTIC ACID) COMPOSITION WITH IMPROVED IMPACT RESISTANCE

(75) Inventors: Thomas Fine, Fontainebleau (FR); Maliha Khusrawy, Bernay (FR)

(73) Assignee: Arkema France, Colombes (FR)

( * ) Notice: Subject to any disclaimer, the term of this patent is extended or adjusted under 35 U.S.C. 154(b) by 1016 days.

(21) Appl. No.: 12/305,127

(22) PCT Filed: Jun. 11, 2007

(86) PCT No.: PCT/FR2007/051403
§ 371 (c)(1),
(2), (4) Date: Jan. 4, 2010

(87) PCT Pub. No.: WO2007/144529
PCT Pub. Date: Dec. 21, 2007

(65) Prior Publication Data
US 2010/0112357 A1    May 6, 2010

Related U.S. Application Data

(60) Provisional application No. 60/819,682, filed on Jul. 11, 2006.

(30) Foreign Application Priority Data

Jun. 16, 2006 (FR) .................. 06 52160

(51) Int. Cl.
| | | |
|---|---|---|
| C08L 23/08 | (2006.01) |
| B29C 47/00 | (2006.01) |
| B29C 47/78 | (2006.01) |
| B29C 47/36 | (2006.01) |
| B29C 51/00 | (2006.01) |
| B32B 27/08 | (2006.01) |
| B32B 27/32 | (2006.01) |
| B32B 27/30 | (2006.01) |
| B32B 27/34 | (2006.01) |
| B32B 27/36 | (2006.01) |
| C08L 67/02 | (2006.01) |
| C08L 67/04 | (2006.01) |
| B29K 67/00 | (2006.01) |
| B29K 23/00 | (2006.01) |

(52) U.S. Cl.
CPC .............. *C08L 67/02* (2013.01); *B32B 27/08* (2013.01); *C08L 67/04* (2013.01); *B29C 47/00* (2013.01); *B29C 47/36* (2013.01); *B29C 47/361* (2013.01); *B29C 47/78* (2013.01); *B29C 51/00* (2013.01); *B29K 2023/08* (2013.01); *B29K 2067/046* (2013.01); *B32B 27/302* (2013.01); *B32B 27/306* (2013.01); *B32B 27/32* (2013.01); *B32B 27/34* (2013.01); *B32B 27/36* (2013.01); *B32B 2250/02* (2013.01); *B32B 2307/7163* (2013.01); *C08L 23/0846* (2013.01); *C08L 23/0869* (2013.01); *C08L 23/0884* (2013.01); *Y10T 428/31511* (2015.04); *Y10T 428/31736* (2015.04); *Y10T 428/31786* (2015.04); *Y10T 428/31797* (2015.04)

(58) Field of Classification Search
None
See application file for complete search history.

(56) References Cited

U.S. PATENT DOCUMENTS

| | | | | |
|---|---|---|---|---|
| 4,753,980 | A * | 6/1988 | Deyrup | 524/369 |
| 5,371,423 | A * | 12/1994 | Berthold et al. | 326/57 |
| 6,020,414 | A * | 2/2000 | Nelsen et al. | 524/424 |
| 6,495,631 | B1 * | 12/2002 | Randall et al. | 525/186 |
| 6,841,597 | B2 * | 1/2005 | Bastioli et al. | 524/47 |
| 6,844,077 | B2 * | 1/2005 | Squier et al. | 428/457 |
| 6,943,214 | B2 * | 9/2005 | Flexman | 525/154 |
| 7,132,490 | B2 * | 11/2006 | Obuchi et al. | 526/317.1 |
| 7,235,604 | B2 * | 6/2007 | Blondel et al. | 525/140 |
| 7,354,973 | B2 * | 4/2008 | Flexman | 525/162 |
| 7,381,772 | B2 * | 6/2008 | Flexman et al. | 525/163 |
| 7,514,503 | B2 * | 4/2009 | Nakamichi | C08L 67/04 523/124 |
| 7,589,151 | B2 * | 9/2009 | Aoki et al. | 525/64 |
| 7,645,839 | B2 * | 1/2010 | Bastioli et al. | 525/437 |
| 7,754,813 | B2 * | 7/2010 | Murakami et al. | 525/191 |
| 7,799,431 | B2 * | 9/2010 | Corzani et al. | 428/411.1 |
| 7,951,438 | B2 * | 5/2011 | Lee et al. | 428/35.8 |
| 8,076,406 | B2 * | 12/2011 | Brule et al. | 524/514 |
| 2006/0173133 | A1 * | 8/2006 | Flexman et al. | 525/191 |
| 2006/0263394 | A1 * | 11/2006 | Oyama | C08L 51/006 424/400 |
| 2007/0255013 | A1 * | 11/2007 | Becraft et al. | 525/418 |

FOREIGN PATENT DOCUMENTS

JP       09-316310    * 12/1997

* cited by examiner

*Primary Examiner* — Vivian Chen
(74) *Attorney, Agent, or Firm* — Millen, White, Zelano and Branigan, P.C.

(57) ABSTRACT

The present invention relates to a poly(lactic acid) composition with improved impact resistance, comprising, by weight: 60% to 97% of poly(lactic acid) (PLA), and 3% to 40% of a mixture of compounds A and B in which A is a copolymer of ethylene and of an unsaturated monomer bearing at least one epoxide or carboxylic acid or carboxylic acid anhydride function, and optionally of alkyl (meth) acrylate, and B is a copolymer of ethylene and of alkyl (meth)acrylate, wherein said mixture having a wt % (A)/wt % (A+B) ratio of between 0.10 and 0.49. The present invention also relates to the manufacture of parts or objects using these compositions.

10 Claims, No Drawings

POLY(LACTIC ACID) COMPOSITION WITH IMPROVED IMPACT RESISTANCE

PRIORITY CLAIM

This application claims benefit, under U.S.C. §119 or §365 of French Application Number FR 0652160, filed Jun. 16, 2006; U.S. 60/819,862, filed Jul. 11, 2006; and PCT/FR2007/051403 filed Jun. 11, 2007.

TECHNICAL FIELD

The present invention relates to a polylactic acid composition with improved impact strength.

PRIOR ART

Polylactic acid (PLA) is a polyester synthesized from a monomer of plant origin. It is of major interest on account of its biodegradable and renewable properties. However, it is a particularly fragile monomer that requires reinforcement against impacts.

In the current state of the art, JP H09-316310 describes PLA compositions containing ethylene-glycidyl methacrylate copolymers grafted with polystyrene or polydimethacrylate, or alternatively polyolefins grafted with maleic anhydride.

More recently, WO 2005/059 031 describes PLA resins that have been impact-modified with a mixture containing at least 50% of an ethylene-alkyl (meth)acrylate-glycidyl (meth)acrylate copolymer with an ethylene-alkyl (meth)acrylate copolymer.

These compositions do indeed have improved impact strength; however, this strength is not entirely satisfactory, especially at low temperature.

Moreover, the fluidity of these compositions is markedly lower than that of PLA. This substantial decrease in fluidity is detrimental to its implementation, most particularly for large-sized, thin injection-molded components.

The aim of the present invention is to propose a PLA composition that has both good impact strength, especially at low temperature, and good fluidity.

DESCRIPTION OF THE INVENTION

The present invention relates to a polylactic acid composition comprising, by weight:
- 60% to 97% of polylactic acid (PLA), and
- 3% to 40% of a mixture of compounds A and B in which:
  - A is a copolymer of ethylene and of an unsaturated monomer bearing at least one epoxide or carboxylic acid or carboxylic acid anhydride function, and optionally of alkyl (meth)acrylate,
  - B is a copolymer of ethylene and of alkyl (meth)acrylate, said mixture having a weight % (A)/weight % (A+B) ratio of between 0.10 and 0.49.

The Applicant has discovered, surprisingly, that PLA compositions predominantly containing ethylene-alkyl (meth)acrylate copolymer in the mixture A+B impart, to the components obtained from these compositions, improved impact strength, at room temperature and most particularly at low temperatures. This impact strength is higher than that of compositions rich in ethylene-alkyl (meth)acrylate-glycidyl (meth)acrylate copolymer.

In addition, these compositions show a good compromise between the impact strength and the viscosity.

According to one variant of the invention, compound A is a copolymer of ethylene and of an unsaturated epoxide that may be obtained by copolymerization of ethylene and of an unsaturated epoxide or by grafting the unsaturated epoxide onto polyethylene. The grafting may be performed in solvent phase or on polyethylene melt in the presence of a peroxide. These grafting techniques are known per se. As regards the copolymerization of ethylene and of an unsaturated epoxide, radical polymerization processes usually functioning at pressures of between 200 and 2500 bar may be used.

Examples of unsaturated epoxides that may be mentioned include:
- aliphatic glycidyl esters and ethers such as allyl glycidyl ether, vinyl glycidyl ether, glycidyl maleate and itaconate or glycidyl (meth)acrylate, and
- alicyclic glycidyl esters and ethers such as 2-cyclohexene 1-glycidyl ether, cyclohexene-4,5-diglycidyl carboxylate, cyclohexene-4-glycidyl carboxylate, 5-norbornene-2-methyl-2-glycidyl carboxylate and endo-cis-bicyclo(2,2,1)-5-hexene-2,3-diglycidyl dicarboxylate.

The copolymer of ethylene and of an unsaturated epoxide may also comprise other monomers, which may be chosen, for example, from:
- α-olefins such as propylene, 1-butene, hexene, etc.,
- vinyl esters of saturated carboxylic acids such as vinyl acetate or vinyl propionate,
- saturated carboxylic acid esters such as alkyl (meth)acrylates possibly containing up to 24 carbons.

By way of example, the unsaturated epoxide may be grafted onto the following polymers:
- polyethylene, copolymers of ethylene and of an α-olefin, polyethylenes such as VLDPE (very-low-density PE), ULDPE (ultra-low-density PE) or PE metallocene;
- copolymers of ethylene and of at least one vinyl ester of a saturated carboxylic acid such as vinyl acetate or vinyl propionate;
- copolymers of ethylene and of at least one unsaturated carboxylic acid ester, such as alkyl (meth)acrylates possibly containing up to 24 carbons;
- EPR elastomers (ethylene/propylene rubber) or EPDM elastomers (ethylene/propylene/diene);
- mixtures of polymers chosen from the preceding.

Compound A of the invention is advantageously an ethylene/alkyl (meth)acrylate/unsaturated epoxide copolymer.

Advantageously, it may contain up to 40% by weight of alkyl (meth)acrylate.

The epoxide is advantageously glycidyl (meth)acrylate.

Advantageously, the alkyl (meth)acrylate is chosen from methyl (meth)acrylate, ethyl acrylate, n-butyl acrylate, isobutyl acrylate, n-octyl acrylate and 2-ethylhexyl acrylate.

The amount of alkyl (meth)acrylate is advantageously from 20% to 35%.

The melt flow index (MFI) of A is advantageously between 2 and 40 and preferably from 5 to 20 (190° C.-2.16 kg).

This copolymer may be obtained by radical polymerization of the monomers.

According to another variant, compound A is a copolymer of ethylene and of an unsaturated carboxylic acid anhydride.

A is either a copolymer of ethylene and of an unsaturated carboxylic acid anhydride, or a polyolefin grafted with an unsaturated carboxylic acid anhydride.

The polyolefin may be chosen from polyolefins that may be grafted with an unsaturated epoxide mentioned above.

Examples of unsaturated dicarboxylic acid anhydrides that may be used as constituents of A are especially maleic anhydride, itaconic anhydride, citraconic anhydride and tetrahydrophthalic anhydride.

Examples that may be mentioned include copolymers of ethylene, of an alkyl (meth)acrylate, of an unsaturated carboxylic acid anhydride and copolymers of ethylene, of a vinyl ester of a saturated carboxylic acid and of an unsaturated carboxylic acid anhydride.

The amount of unsaturated carboxylic anhydride may be up to 15% by weight of the copolymer and the amount of ethylene at least 50% by weight.

Advantageously, A is a copolymer of ethylene, of an alkyl (meth)acrylate and of an unsaturated carboxylic anhydride. Preferably, the alkyl (meth)acrylate is such that the alkyl contains 2 to 10 carbon atoms.

The alkyl (meth)acrylate may be chosen from those mentioned above.

The MFI of A may be, for example, between 0.1 and 50 (g/10 minutes at 190° C. under 2.16 kg).

According to the invention, compound B is a copolymer of ethylene and of an alkyl (meth)acrylate. The alkyl (meth)acrylate may be advantageously chosen from methyl (meth)acrylate, ethyl acrylate, n-butyl acrylate, isobutyl acrylate, n-octyl acrylate and 2-ethylhexyl acrylate.

The amount of alkyl (meth)acrylate is advantageously from 20% to 40%.

According to a first aspect of the invention, the composition has a weight % (A)/weight % (A+B) ratio of the mixture of between 0.15 and 0.40 and preferentially between 0.20 and 0.30.

The present invention also relates to a process for preparing the compositions mentioned above via extrusion. The process may be performed according to two particular embodiments:

by simultaneously mixing the PLA, A and B, or
by successively performing the following two steps:
 a) mixing A and B, and then
 b) mixing the product obtained from a) with the PLA.

In addition, the invention relates to the use of these compositions, and also to components or objects manufactured from such compositions.

In a nonlimiting manner, mention may be made of the manufacture of injection-molded components, of extruded and optionally thermoformed films and sheets, of hollow bodies formed by extrusion blow-molding, of containers such as trays, etc.

The components or objects thus obtained may undergo an annealing step, in order to control the crystallinity.

This control may also be obtained by adding a nucleating agent to the composition according to the invention or to the PLA.

The invention also relates to a multilayer structure comprising a layer of the composition corresponding to the invention and at least one layer of a thermoplastic chosen from polyethylene (PE), polypropylene (PP), polystyrene (PS), polyamide (PA) and ethylene/vinyl alcohol (EVOH) copolymer.

The present invention will now be illustrated by the particular production examples that will be described hereinbelow. It is pointed out that these examples are not in any way intended to limit the scope of the present invention.

EXAMPLES

Materials Used

Polylactic acid or PLA is sold by Natureworks under the reference PLA 2002D.

The compound A used is a terpolymer of ethylene (68% by weight), of methyl acrylate (MeA) (24% by weight) and of glycidyl methacrylate (GMA) (8% by weight), having an MFI equal to 6. This terpolymer is sold by Arkema France under the reference Lotader® AX8900.

The compound B used is a copolymer of ethylene (70% by weight) and of butyl acrylate (30% by weight), having an MFI of between 1.5 and 2.5. This copolymer is sold by Arkema France under the reference Lotryl® 30BA02.

Characteristics of the Compositions Tested:
 Reference composition: Test 1: 100% PLA
 Comparative compositions: Tests 2 and 6 to 8
 Test 2: 80% PLA+20% B
 Test 6: 80% PLA+10% A+10% B, i.e. % A/% (A+B)=0.5
 Test 7: 80% PLA+15% A+5% B, % A/% (A+B)=0.75
 Test 8: 80% PLA+20% A+5% B, % A/% (A+B)=1
 Compositions according to the invention: Tests 3 to 5
 Test 3: 80% PLA+2% A+18% B, i.e. % A/% (A+B)=0.1
 Test 4: 80% PLA+4% A+16% B, i.e. % A/% (A+B)=0.2
 Test 5: 80% PLA+6% A+14% B, i.e. % A/% (A+B)=0.3

Method for Preparing the Various Compositions:
 Compounding
 The compositions are obtained by compounding on an L/D 30 twin-screw extruder equipped with a degassing system and an extrudate cutter, with a throughput of 15 kg and a screw speed of 280 rpm. The temperature profile used is an increasing temperature profile ranging from 170° C. to 200° C. The material temperature is 220° C.

After compounding, the PLA was dried for 4 hours at 70° C.

Molding of the Samples:
 The granules are dried and then molded on a standard injection press under the following conditions:
 plasticizing cylinder temperature: 180/200° C.
 mold temperature: 30° C.
 injection pressure: 1200 bar
 maintenance pressure: 700 bar The standardized specimens (80×10×4 mm$^3$) thus obtained are annealed for 30 minutes at 100° C. under a light load.

Evaluation of the Compositions:
 Impact strength on prenotched specimens of the Charpy type according to ISO 179 93 1 Ae at 23° C. and −40° C.
 Melt flow index (MFI) measured according to standard ISO 1133-1981-F at a temperature of 190° C. and under a weight of 2.16 kg.

The test results are summarized in Table 1 below.

TABLE 1

|  | Test | | | | | | | |
|---|---|---|---|---|---|---|---|---|
|  | 1 (ref.) | 2 (comp.) | 3 (inv.) | 4 (inv.) | 5 (inv.) | 6 (comp.) | 7 (comp.) | 8 (comp.) |
| PLA % | 100 | 80 | 80 | 80 | 80 | 80 | 80 | 80 |
| A % | 0 | 0 | 2 | 4 | 6 | 10 | 15 | 20 |
| B % | 0 | 20 | 18 | 16 | 14 | 10 | 5 | 0 |

TABLE 1-continued

| | Test | | | | | | | |
|---|---|---|---|---|---|---|---|---|
| | 1 (ref.) | 2 (comp.) | 3 (inv.) | 4 (inv.) | 5 (inv.) | 6 (comp.) | 7 (comp.) | 8 (comp.) |
| % A/%(A + B) | — | — | 0.1 | 0.2 | 0.3 | 0.5 | 0.75 | 1 |
| Charpy impact strength at 23° C. (kJ/m$^2$) | 3.8 | 6.5 | 16.1 | 20.9 | 21.4 | 24.5 | 20.7 | 16.6 |
| Charpy impact strength at −40° C. (kJ/m$^2$) | 3.7 | 5 | 5.1 | 5.6 | 5 | 3.8 | 3.9 | 3.2 |
| MFI | 2.9 | 2.4 | 1.9 | 1.9 | 1.7 | 1.05 | 1.4 | 1.0 |

Test 1 clearly shows that PLA is a fragile material requiring reinforcement against impacts. It serves as reference.

Test 2 shows that, without compound A, the level of reinforcement remains low, especially at 23° C.

The comparative tests 6 to 8 correspond to the invention disclosed in WO 2005/059 031. Such compositions predominantly containing compound A give satisfactory reinforcement against impacts at 23° C. On the other hand, no improvement in the impact strength is observed at −40° C., or even slight embrittlement is observed when compound A is used alone.

Tests 3, 4 and 5 correspond to the invention. Such compositions containing more than 50% of compound B in the mixture A+B give excellent impact strength results at 23° C. and also at −40° C. Furthermore, these compositions allow good fluidity to be maintained.

The invention claimed is:

1. A polylactic acid composition comprising, by weight:
    60% to 97% of polylactic acid (PLA), and
    3% to 40% of a mixture of compounds A and B in which:
    A is an ethylene-methyl, ethyl, n-butyl or isobutyl (meth)acrylate-maleic anhydride terpolymer or an ethylene-methyl, ethyl, n-butyl or isobutyl (meth)acrylate-glycidyl methacrylate terpolymer,
    B is a copolymer of ethylene and of methyl, ethyl, n-butyl or isobutyl (meth)acrylate, said mixture having a weight % (A)/weight % (A+B) ratio of between 0.15 and 0.40.

2. The composition as claimed in claim 1, wherein A is ethylene and of methyl acrylate and of glycidyl methacrylate terpolymer.

3. The composition as claimed in claim 1, wherein B is a copolymer of ethylene and of ethyl, n-butyl, or isobutyl acrylate.

4. The composition as claimed in claim 1, wherein the weight % (A)/weight % (A+B) ratio of the mixture is between 0.20 and 0.30.

5. A process for preparing a polylactic acid composition comprising, by weight:
    60% to 97% of polylactic acid (PLA), and
    3% to 40% of a mixture of compounds A and B in which:
    A is an ethylene-methyl, ethyl, n-butyl or isobutyl (meth)acrylate-maleic anhydride terpolymer or an ethylene-methyl, ethyl, n-butyl or isobutyl (meth)acrylate-glycidyl methacrylate terpolymer,
    B is a copolymer of ethylene and of methyl, ethyl, n-butyl or isobutyl (meth)acrylate, said mixture having a weight % (A)/weight % (A+B) ratio of between 0.15 and 0.40, comprising the step of mixing of the PLA, A, and B by extrusion.

6. The process of claim 5, wherein said extrusion step comprises:
    mixing by extrusion of A and B in a first step, and then mixing by extrusion of the product obtained from the first step with PLA.

7. A component or object obtained from a polylactic acid composition comprising, by weight:
    60% to 97% of polylactic acid (PLA), and
    3% to 40% of a mixture of compounds A and B in which:
    A is a an ethylene-methyl, ethyl, n-butyl or isobutyl (meth)acrylate-maleic anhydride terpolymer or an ethylene-methyl, ethyl, n-butyl or isobutyl (meth)acrylate-glycidyl methacrylate terpolymer,
    B is a copolymer of ethylene and of methyl, ethyl, n-butyl or isobutyl (meth)acrylate, said mixture having a weight % (A)/weight % (A+B) ratio of between 0.15 and 0.40, wherein the component or object is prepared via a process chosen from molding, extrusion and thermoforming.

8. The component or object as claimed in claim 7, whose preparation also comprises an annealing step.

9. The component or object of claim 7, wherein said component comprises a multilayer structure further comprising at least one layer of a thermoplastic chosen from polyethylene (PE), polypropylene (PP), polystyrene (PS), polyamide (PA) and ethylene/vinyl alcohol (EVOH) copolymer.

10. A polylactic acid composition comprising, by weight:
    60% to 97% of polylactic acid (PLA), and
    3% to 40% of a mixture of compounds A and B in which:
    A is an ethylene-methyl, ethyl, n-butyl or isobutyl (meth)acrylate-maleic anhydride terpolymer or an ethylene-methyl, ethyl, n-butyl or isobutyl (meth)acrylate-glycidyl methacrylate terpolymer,
    B is a copolymer of ethylene and of methyl, ethyl, n-butyl or isobutyl (meth)acrylate, said mixture having a weight % (A)/weight % (A+B) ratio of between 0.25 and 0.40.

* * * * *